April 15, 1952  J. W. F. HOLL  2,592,804
WHEEL BALANCING MACHINE
Filed May 26, 1947  2 SHEETS—SHEET 1
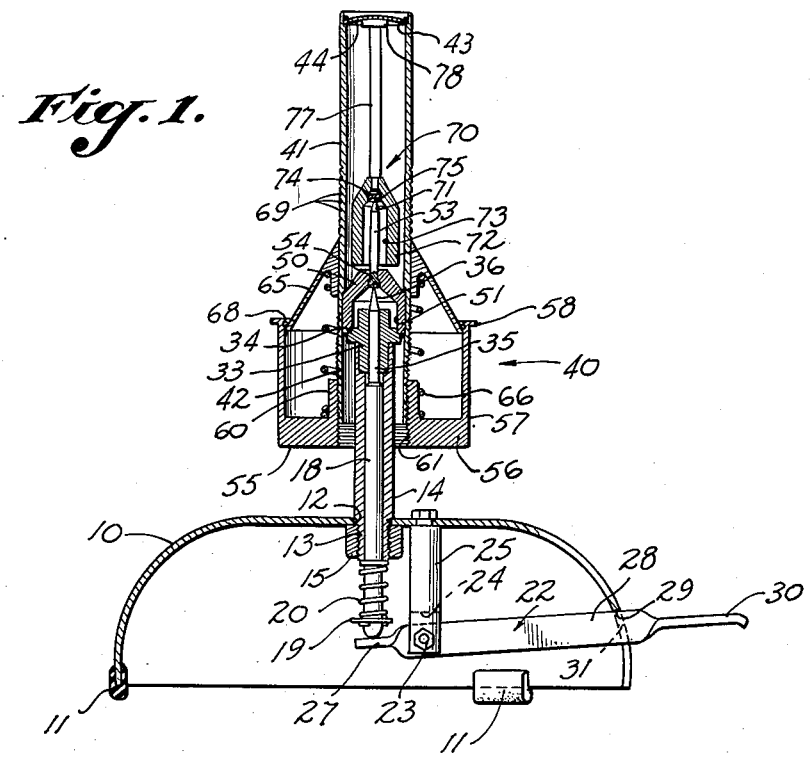
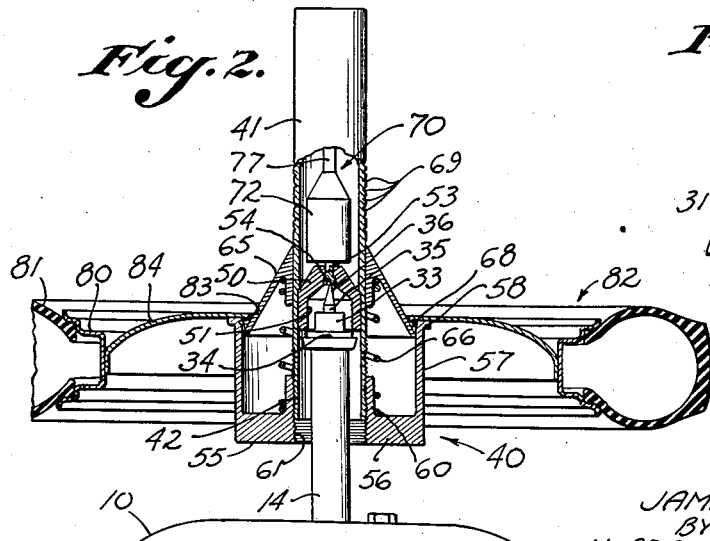
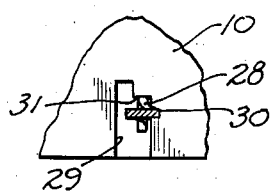
INVENTOR:
JAMES W. F. HOLL,
BY HIS ATTORNEYS
HARRIS, KIECH, FOSTER & HARRIS,

INVENTOR:
JAMES W. F. HOLL,
BY HIS ATTORNEYS
HARRIS, KIECH, FOSTER & HARRIS,
BY

Patented Apr. 15, 1952

2,592,804

UNITED STATES PATENT OFFICE 2,592,804

WHEEL BALANCING MACHINE

James W. F. Holl, Los Angeles, Calif.

Application May 26, 1947, Serial No. 750,575

5 Claims. (Cl. 73—66)

My invention relates to balancing machines and particularly to a balancing machine for use in statically balancing automobile and other vehicle wheels and tires, and the like, in a horizontal plane to enable them to rotate at high speed without abnormal vibration.

An object of the invention is to provide an improved wheel balancing machine having means by which wheel units of different sizes may be supported in a horizontal plane on a vertical spindle and including means for indicating the condition of balance of the wheel unit or, in other words, the position of the wheel unit with respect to the horizontal.

Another object is to provide a machine, of the character referred to, having a vertical spindle upon the upper pointed end of which a wheel supporting unit is pivotally supported to adapt it to tilt with respect to the horizontal, and it is a further and extremely important object to provide means whereby the wheel supporting means can be minutely and accurately adjusted vertically with respect to the spindle so as to raise and lower the center of gravity of the wheel unit with respect to the pointed tip of the spindle. In accordance with the present invention this object is best accomplished by constructing the wheel supporting means in two axially aligned parts, a first part being pivotally supported on the pointed tip of the spindle while the second part has a screw thread engagement with the first part to adapt the two parts for relative axial adjustment so as to raise and lower the center of gravity of the wheel unit with respect to the tip of the spindle, the interengaging screw threads being of relatively fine pitch to enable the setting of the wheel unit with respect to the spindle to be adjusted with great precision in an expeditious manner without the use of tools.

Another object of the invention is to provide a wheel balancing machine of the class indicated in which the wheel supporting means is so constructed that the wheel unit rests upon a firm base or seat to prevent tilting movement thereof with respect to the wheel supporting means and it is a further object in this connection to provide means for accurately centering the wheel unit on the wheel supporting means, such centering means being in the form of a resiliently operated cone adapted to engage in the central orifices of wheels of different sizes and adapted to yield under the weight of the wheel unit so as to permit the latter to rest upon the base or seat.

Another object is to provide a balancing machine in which the supporting spindle is arranged to be slid vertically in a stationary standard so that it may be retracted during the placing of a wheel unit on the machine. This constitutes an important and very desirable improvement in machines of this type since it enables the spindle to be withdrawn from operative position so that its pointed end cannot be damaged by the force of impact of the wheel supporting means thereagainst under the weight of the relatively heavy wheel unit.

A further and important object of the invention is to provide, in a balancing machine of the character referred to, an extremely sensitive and accurate indicating means for indicating the condition of balance of the wheel unit mounted on the machine, such indicating means preferably consisting of a counterweighted element pendulously arranged within the wheel supporting means and having a pointer or index adapted to register with marks, preferably in the form of crossing hairlines, on the wheel supporting means, said weighted element being so pivoted within the wheel supporting means as to function in the manner of a plumb so that regardless of the inclination of the wheel supporting means the element will remain in true erect position.

Further objects of my invention will be apparent from the following specification and from the accompanying drawings, which are intended for purposes of illustration only, and in which:

Fig. 1 is a vertical sectional view through my improved wheel balancing machine, showing the relation of the parts thereof prior to the mounting of a wheel unit thereon;

Fig. 2 is a view similar to Fig. 1, illustrating a wheel unit as having been applied to the machine, the parts of the machine being shown in the positions assumed prior to adjusting the wheel supporting means to change the position of the center of gravity of the wheel unit with respect to the balance spindle;

Fig. 3 is a vertical sectional view, taken on line 3—3 of Fig. 2, showing the latching means for retaining the supporting spindle in extended and retracted positions;

Figure 4:
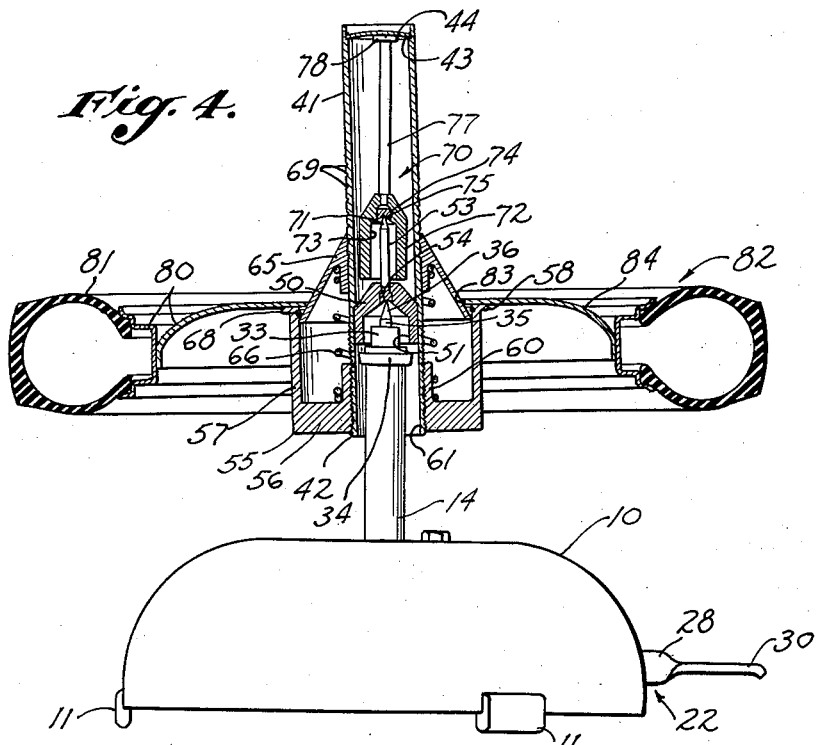
Fig. 4 is a view similar to Fig. 2, showing the wheel supporting means in its adjusted position and indicating the wheel unit in an unbalanced condition.

Referring to the drawings in detail, my improved wheel and tire balancing machine includes a hollow dome shaped base member or pedestal 10 which is provided with rubber rests or feet 11 adapted to rest upon a floor, table or other support. The base member 10 has a central hole 12 for receiving the lower reduced end 13 of a tubular post 14 which is screw threaded externally. A nut 15 screwed onto the threaded end 13 of the post 14 and set up against the under side of the base member 10 secures the post in upright position on the base member (Fig. 1). A plunger rod 18 is adapted to slide vertically in the bore of the tubular post 14. The lower end of the plunger rod 18 projects below the lower end of the post 14 and carries a collar or washer 19 at its extremity. A coil spring 20 surrounding the plunger rod 18 between the post 14 and the collar normally functions to maintain the rod in lowermost position.

The plunger rod 18 is adapted to be slid upwardly in the post 14 by means of a foot lever 22 which is pivoted on a stud 23 extending transversely across a slot 24 in the lower end of a support 25 disposed within the base member and depending from its top portion. The foot lever 22 has an inner end 27 engageable with the lower end of the plunger rod 18 and an outer end 28 which projects outwardly through an opening 29 in the side of the base member, the end 28 being twisted at its extremity to provide a foot rest or pedal 30. As shown in Fig. 3, the opening 29 is narrowed in width at its upper end, thereby providing a locking shoulder 31 for the purpose to be later explained.

Secured within the upper end of the tubular post 14 is a bushing 33 having a peripheral flange or seat 34. The bushing 33 serves as a bearing in which a spindle 35 is adapted to slide. The spindle 35 has an acutely pointed conical tip or balance point 36 at its upper end, this tip normally projecting slightly above the upper end of the bushing 33 as shown in Fig. 1. The lower end of the spindle 35 projects below the lower end of the bushing 33 and rests upon the upper end of the plunger rod 18 so that when the pedal 30 is depressed and the plunger rod thus slid upwardly against the action of the spring 20, the upper pointed tip 36 of the spindle will be projected above the end of the bushing to a greater extent as shown in Figs. 2 and 4.

Figure 5:
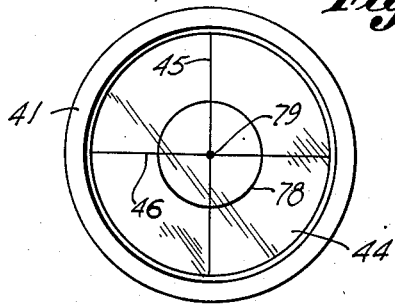
Fig. 5 is a plan view of the upper end of the machine, showing the indicator pointer in register with the intersection of the cross hairs to signify that the wheel supporting means is in plumb and that the wheel unit is in balance.
Figure 7:
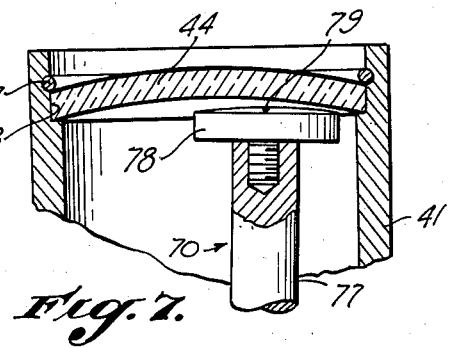
Fig. 7 is a cross sectional view through the upper or indicator end of the machine showing the relative positions of the wheel supporting means and the indicator element when an unbalanced condition exists.
Figure 6:
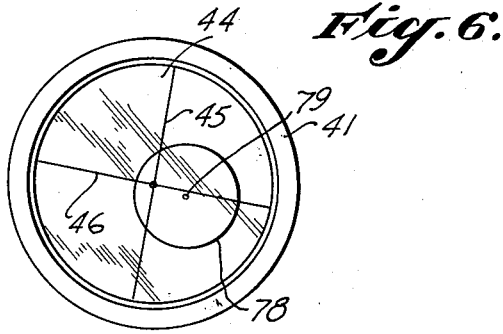
Fig. 6 is a view similar to Fig. 5 but illustrating the pointer out of register with the intersection of the cross hairs to denote that the wheel unit is out of balance.

Adapted to pivot upon the pointed tip 36 of the spindle 35 is a wheel supporting means, indicated generally at 40. The wheel supporting means 40 includes a relatively long, vertical sleeve 41, the lower end of which is provided with external screw threads 42 of relatively fine pitch. Seated in a recess 43 in the upper end of the sleeve 41 is a circular, transparent dial 44 (Fig. 7) which, as shown in Figs. 5 and 6, is provided with a pair of intersecting cross hair marks 45 and 46. The dial 44 may be retained in the recess 43 by means of a split ring 47 seated in a groove in the sleeve 41. Secured within the sleeve 41 is an insert or seat member 50 having an axial recess 51 in its lower end to adapt it to be placed over the upper end of the bushing 33 and spindle 35. The lower end of the seat member 50 is adapted to rest upon the peripheral flange or seat 34 of the bushing 33. Secured within an axial bore of the seat member 50 is an auxiliary spindle 53 having a conical socket 54 in its lower end, the conical side of the socket forming a continuation of the conical inner end of the recess 51. The conicity of the socket 54 is considerably more obtuse than the relatively sharp pointed tip 36 of the spindle 35 so that when the sleeve 41 is lowered over the upper end of the post 14 to cause the tip 36 to be disposed in the socket 54, the sleeve is permitted to tilt on the tip, which serves as a pivot, within prescribed limits.

The sleeve 41 normally is maintained in true erect position by means of a support member 55 which, in addition to serving as a support for the wheel unit to be tested, also provides a counterweight for the sleeve. The support member 55 is of substantially cup shape, having a bottom portion 56 and a peripheral rim 57 which is provided at its upper end with an outwardly flared ledge or seat 58. The support member 55 has a central hub 60 which is internally screw threaded, as indicated at 61, to adapt it to be screwed onto the lower threaded end of the sleeve 41 and to be adjusted vertically with respect to the sleeve. A frusto-conical centering element 65 is slidably disposed on the sleeve 41 with its larger or base end disposed within the support member 55. The centering element 65 normally is projected upwardly under the influence of a coil spring 66 surrounding the sleeve 41 with its lower and upper ends engaging the support member 55 and the element 65, respectively. The centering element 65 may be retained with its lower end disposed within the support member 55 by means of a split ring 68 held in a groove in the member and engageable with the base end of the element (Fig. 1). The upper end of the centering element 65 is adapted to register with any of a plurality of axially spaced peripheral grooves 69 provided in the sleeve 41, when the sleeve and the support member 55 are relatively adjusted.

Adapted to be pendulously supported by the auxiliary spindle 53 is a gravitationally operated indicator element 70, it being noted that the auxiliary spindle is provided with a relatively acutely pointed upper end or tip 71. The indicator element 70 includes a counterweight 72 which has an axial hole 73 provided with an inner conical end. Held in a recess at the inner conical end of the hole 73 is a relatively hard insert 74 having a relatively obtuse conical seat 75 for receiving the pointed tip 71 of the auxiliary spindle 53. Held in an axial hole in the upper end of the counterweight 72 is the lower end of a rod or stem 77 which carries a button like indicator 78 at its upper end. The indicator 78 is disposed slightly below the transparent dial 44 so as to be visible therethrough and the indicator has a central dot or indentation 79 (Fig. 7) in its upper surface which is adapted to register with the intersection of the cross hair marks 45 and 46, when the wheel unit is in balance, in the manner to be explained hereinafter. It will be apparent from the above that the indicator element 70 is pivotally mounted by reason of its seat 75 resting upon the pointed tip 71 of the auxiliary spindle 53. In other words, the weight 72 is suspended from the tip 71 and may be said to be pendulously mounted. Due to this mounting or suspension of the weight 72, the force of gravity acts to maintain the stem 77 in true erect or plumb condition, regardless of the inclination of the auxiliary spindle 53 and associated parts.

The method of operation of the improved wheel balancing machine is explained as follows: Assuming that it is desired to statically balance the individual wheels of a vehicle, that is, each wheel 80 and its tire 81 which comprise a wheel unit 82, before removing each wheel unit from the vehicle, the axle for the wheel unit is first jacked up and the unit rotated manually. Each wheel of the vehicle is checked to determine whether or not wobbling occurs therein due to its having been bent. By holding a chalk adjacent each side of the rotating wheel the point of wobble can be determined, after which weights may be placed on the side of the wheel opposite to the chalk mark. It is necessary to condition each wheel unit 82 before placing it on the balancing machine, that is, to thoroughly clean the same to remove grease and other foreign matter which might tend to impair the balance thereof, and to smooth the edges of the central opening 83 of the wheel.

To prepare the balancing machine for operation, the pedal 30 is sprung laterally from beneath the shoulder 31 and its end 28 thus permitted to ascend to a position where it engages the upper end of the slot 29, under the influence of the spring 20 which also acts to slide the plunger rod 18 downwardly to permit the support spindle 35 to descend to the position illustrated in Fig. 1. The sleeve 41 and wheel supporting member 55 next are relatively rotated in a direction to cause the sleeve to be unscrewed upwardly from the member until such time as the lowermost groove or graduation 69 registers with the upper apex end of the conical centering element 65. Since the lower annular edge of the seat member 50 of the sleeve 41 is resting upon the flange 34 of the stationary bushing 33, the relative rotation of the sleeve 41 and supporting member 55, as explained above, has the effect to lower the supporting member with respect to the tip 36 of the spindle 35 so that the center of gravity of the wheel supporting means 40 is consequently lowered and the machine is said to be in a "below center of gravity" condition. With the parts of the balancing machine adjusted in the manner explained above and as shown in Fig. 1, the machine is ready to perform a wheel balancing operation. It will be noted by reference to Fig. 1 that due to the fact that the several tiltable parts of the machine are arranged in axial alignment and are each perfectly balanced, they assume the true erect or plumb relationship shown in this view.

A wheel unit 82 is next placed on the machine by lowering the unit over the vertical sleeve 41 until the edge of the circular center hole 83 engages the conical outer surface of the centering element 65 which then acts to center the wheel unit or, in other words, causes the wheel unit to be concentrically disposed with respect to the axis of the machine. As the wheel unit 82 is lowered, the centering element 65 yields in a downward direction so that the disk portion 84 of the wheel eventually comes to rest upon the annular ledge or seat 58 of the support member 55 to be supported thereby. As is usual in wheel units of modern vehicles, the disk portion 84 is offset laterally out of the plane of the tire 81 so that when the wheel unit 82 is placed on the machine as shown in Fig. 2 the center of gravity of the unit will be disposed considerably below the balance point 36 of the spindle 35.

The pedal 30 is next depressed to cause the inner end 27 of the lever 22 to force the plunger rod 18 and spindle 35 upwardly to the position shown in Fig. 2, the foot lever 22 being then locked in this position by moving its end 28 laterally under the shoulder 31. As the balancing spindle 35 is thus raised, its pointed upper end 36 engages in the conical socket 54 to raise the entire assembly, including the seat member 50, sleeve 41, support member 55, centering element 65 and wheel unit 82 so that the assembly is, in effect, suspended from the acutely pointed tip 36 of the spindle. It is apparent, therefore, that if the wheel unit 82 is in balance the parts will remain in plumb as shown in Fig. 2. On the other hand, if the wheel unit 82 is out of balance, the entire assembly will pivot on the balance point 36. Such an unbalanced condition may be readily detected by observing the relation between the dot 79 of the indicator 78 and the intersection of the cross hair markings 45 and 46 of the dial 44. When an unbalanced condition exists, balancing weights, of any conventional form, are applied to the wheel unit 82 at proper locations thereon to effect approximate equilibrium of the unit.

The wheel unit is now in condition for relative adjustment between the balance point 36 and the center of gravity and to effect such adjustment the sleeve 41 is screwed downwardly into the support member 55, as shown in Fig. 4, until the wheel unit 82 and the wheel support 40 become top heavy, that is, until the center of gravity of the wheel unit is disposed above the balance point 36, at which time the wheel unit will tend to tilt with respect to the horizontal in the direction of its greatest weight and to remain in this position. The sleeve 41 is next unscrewed from the support member 55, one turn at a time, until the wheel unit 82 begins to right itself in a listless manner. At this juncture, the wheel unit is approximately ⅛ inch above the center of gravity position of the entire suspended assembly. The sleeve 41 is next unscrewed from the support member 55 approximately ¼ inch (as indicated by the graduations 69) to place the wheel unit 82 about ⅛ inch below the center of gravity position, this condition being necessary to overcome the friction between the balance point 36 and the socket 54. The wheel unit 82 is now in the most sensitive and practical balance checking position and by observing the relation between the dot 79 and the cross hairs 45 and 46 conditions of unbalance may be readily determined, after which proper balance weights may be applied to the wheel unit in various locations to correct the unbalanced condition. When no wheel wobble is evident, it is customary to place half the weight on each side of the wheel unit to prevent the development of such wobble as might occur if the weights were applied to one side only of the wheel unit. It has been found advisable to first apply one-half of the balance weights to each side of the wheel unit at the proper place for correct balance, and thereafter test the unit on the machine, since a slight readjustment of the top side weights may be necessary to obtain perfect balance due to the fact that the lower side weights are now below the center of gravity. In testing and balancing the wheel units, it is necessary that the machine be operated in a room which is free from drafts and other conditions which might tend to throw the wheel off balance. It is to be particularly noted that after the balancing machine has been adjusted for one wheel unit of a vehicle, the other wheel units of the same vehicle or like wheel units of vehicles of the same year, make and model may be tested without requiring readjustment of the parts of the machine for correct balance position.

It will be observed from the foregoing that my invention provides a wheel balancing machine which is relatively simple in construction, yet highly efficient in operation. As a particular feature, the invention provides means whereby the position of the center of gravity of a wheel unit may be conveniently and expeditiously adjusted with respect to the balance point and with great precision so that the balance condition of a wheel unit may be quickly and accurately determined. In this respect, it is to be noted that during the adjustment of the machine, the wheel unit is adequately supported at all times so that it is not necessary to manually sustain the weight of the wheel unit during such adjustment. Moreover, in the present improved balancing machine the balance point or spindle is retractable so that during the placing of a relatively heavy wheel unit on the machine the spindle may be withdrawn from operative position to prevent damage thereof. As another important improvement, the present balancing machine is provided with an extremely sensitive balance indicating means, such means being in the nature of a plumb bob which always remains in erect position regardless of the tilting movement imparted to the other parts due to an unbalanced condition. The indicating means includes a dial having intersecting cross hair lines which may be readily brought into register with the stationary element to indicate a true balanced condition.

While I have herein shown and described the wheel balancing machine as embodied in a preferred form of construction and applied to use in a particular manner, it will be obvious that various changes may be made therein without departing from the spirit of the invention. Consequently, I do not wish to be limited in this respect, but desire to be afforded the full scope of the appended claims.

I claim as my invention:

1. A machine for balancing wheels, including: a stationary, vertical, tubular post having an annular seat; a spindle slidable in said post and having a balance point at its upper end; a vertical sleeve having an insert provided with a socket adapted to receive said balance point to pivotally mount said sleeve on said point, said insert being adapted to rest upon said annular seat when said balance point is withdrawn from said socket; a support member axially aligned with said sleeve adjacent the lower end thereof and adapted to support a wheel to be balanced in substantially horizontal position, said sleeve and said support member having interengaging screw threads so as to permit relative axial movement therebetween to adjust the position of the center of gravity of the wheel vertically with respect to said balance point while said sleeve, said support member and the wheel are supported solely by said balance point; conical centering means movable on said sleeve for centering the wheel concentrically of said balance point; spring means operative to move said centering means to wheel centering position; and operating means for sliding said spindle in said post, movement of said spindle in an upward direction causing said balance point to engage in said socket to raise said sleeve, support member, centering means and wheel to permit pivotal movement thereof on said point, and movement of said spindle in a downward direction retracting said balance point to cause lowering of said sleeve, support member, centering means and wheel with said insert coming to rest upon said annular seat to limit such lowering.

2. A machine for balancing wheels, including: a vertical spindle having a balance point at its upper end; a vertical sleeve surrounding said spindle and provided with an insert having a socket for receiving said balance point to pivotally mount said sleeve on said point; a support member carried by and adjustable axially of said sleeve, said support member being adapted to support a wheel to be balanced in substantially horizontal position; wheel centering means carried by and movable with respect to said support member for centering the wheel with respect to said balance point; a transparent indicator dial inserted in the upper end of said sleeve and having cross hairs thereon; an auxiliary spindle carried by and projecting upwardly from said insert and provided with a pointed upper end; and an indicator element pivotally mounted on said pointed end of said auxiliary spindle and so weighted that it assumes a true vertical position regardless of the inclination of said sleeve, said element including a disc disposed below and visible through said dial and having an index registrable with said cross hairs.

3. A machine for balancing wheels, including: a vertical spindle having a balance point at its upper end; a vertical sleeve surrounding said spindle and provided with an insert having a socket for receiving said balance point to pivotally mount said sleeve on said point; a support member carried by and adjustable axially of said sleeve, said support member being adapted to support a wheel to be balanced in substantially horizontal position; a transparent indicator dial inserted in the upper end of said sleeve and having cross hairs thereon; an auxiliary spindle carried by and projecting upwardly from said insert and provided with a pointed upper end; and a gravitationally operated indicator element pivotally mounted on said pointed end of said auxiliary spindle and capable of assuming a true vertical position regardless of the inclination of said sleeve and said auxiliary spindle, said element including a disc disposed below and visible through said dial and having a dot registrable with said cross hairs.

4. A machine as defined in claim 3, in which said indicator element includes a tubular counterweight surrounding said auxiliary spindle and disposed below its pointed end, said counterweight functioning to maintain said indicator element in true erect position.

5. In a machine for balancing wheels, the combination of: a base member; a vertical tubular post on said base member; a plunger slidable in said post; a balance spindle slidable in said post above said plunger and having a balance point at its upper end; foot operated means for sliding said plunger upwardly in said post; spring means for sliding said plunger downwardly in said post; a vertical sleeve having its lower end surrounding a portion of said post and provided with socket means on its interior by which said sleeve is pivotally mounted on said balance point; cup-shaped support member axially aligned with said sleeve adjacent the lower end thereof and adapted to support a wheel to be balanced in substantially horizontal position, said sleeve and said supporting member having interengaging screw threads so as to permit relative axial movement therebetween to adjust the position of the center of gravity of the wheel vertically with respect to said balance point while said sleeve, said support member and the wheel are supported solely by said balance point; a hollow, conical centering means slidable on said sleeve for centering the wheel concentrically of said balance point; spring means disposed within and compressed between said support member and said centering means and normally projecting said centering means upwardly but permitting downward movement thereof under the weight of the wheel to cause the wheel to rest upon said support member; a transparent dial carried by said sleeve at its upper end, said dial having cross hairs thereon; and a gravitationally operated indicator element pivotally mounted within said sleeve and having an index disposed below and visible through said dial and registrable with said cross hairs.

JAMES W. F. HOLL.

REFERENCES CITED

The following references are of record in the file of this patent:

UNITED STATES PATENTS

| Number | Name | Date |
|---|---|---|
| 609,395 | Atwood | Aug. 16, 1898 |
| 1,524,041 | Leighton | Jan. 27, 1925 |
| 1,701,464 | Kraft | Feb. 5, 1929 |
| 2,075,421 | Bennett | Mar. 30, 1937 |
| 2,170,848 | Bennett | Aug. 29, 1939 |
| 2,270,657 | Kraft | Jan. 20, 1942 |
| 2,298,656 | Smith | Oct. 13, 1942 |
| 2,316,524 | Martin | Apr. 13, 1943 |
| 2,461,591 | Currier | Feb. 15, 1949 |
| 2,502,633 | Shepard | Apr. 4, 1950 |
| 2,506,002 | Tinkham | May 2, 1950 |

FOREIGN PATENTS

| Number | Country | Date |
|---|---|---|
| 500,559 | France | Dec. 24, 1919 |